United States Patent
Hofmeister et al.

(10) Patent No.: US 12,535,499 B2
(45) Date of Patent: Jan. 27, 2026

(54) BULKHEADS AND WATER DAMS FOR AIR DATA PROBES

(71) Applicant: Rosemount Aerospace Inc., Burnsville, MN (US)

(72) Inventors: John Hofmeister, Hampton, MN (US); Timothy Thomas Golly, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 279 days.

(21) Appl. No.: 18/201,694

(22) Filed: May 24, 2023

(65) Prior Publication Data

US 2024/0393361 A1   Nov. 28, 2024

(51) Int. Cl.
   *G01P 5/165* (2006.01)

(52) U.S. Cl.
   CPC .................... *G01P 5/165* (2013.01)

(58) Field of Classification Search
   CPC ............ G01F 1/46; B64D 43/02; G01P 5/165
   See application file for complete search history.

(56) References Cited

U.S. PATENT DOCUMENTS

| | | | |
|---|---|---|---|
| 10,227,139 B2 | 3/2019 | Golly et al. | |
| 10,589,870 B2 | 3/2020 | Golly et al. | |
| 10,884,014 B2 | 1/2021 | Golly et al. | |
| 11,262,227 B2 | 3/2022 | Jacob et al. | |
| 11,428,707 B2 | 8/2022 | Johnson et al. | |
| 2016/0280391 A1* | 9/2016 | Golly | G01P 13/025 |
| 2018/0259547 A1* | 9/2018 | Abdullah | G01P 5/165 |
| 2018/0259548 A1* | 9/2018 | Anderson | G01P 5/165 |
| 2020/0233007 A1 | 7/2020 | Jacob et al. | |
| 2020/0393484 A1 | 12/2020 | Johnson et al. | |
| 2021/0181229 A1* | 6/2021 | Sanden | G01P 13/025 |

OTHER PUBLICATIONS

European Search Report received in EP Application No. 24177604, Oct. 1, 2024, 10 pages.

* cited by examiner

*Primary Examiner* — Nathaniel J Kolb
(74) *Attorney, Agent, or Firm* — Suiter Swantz IP

(57) ABSTRACT

In accordance with at least one aspect of this disclosure, an air data probe includes, an outer shell defining an airflow path from an inlet at a proximal end thereof to a distal end thereof and a heater configured to be installed within the outer shell an in the airflow path, the water dam comprising, one or more sensing elements at a distal end thereof. The system also includes, a water dam disposed on or in the heater winding and between a proximal end and distal end of the heater winding configured to impede a flow of water droplets and ice crystals to permit proper drain hole operation, prevent moisture buildup in rear areas of the probe and pressure lines, and prevent interaction of the flow of water and the one or more sensing elements. The water dam is configured to mechanically stabilize itself on or in the heater winding during installation of the heater winding and water dam into the outer shell.

14 Claims, 3 Drawing Sheets

Fig. 1
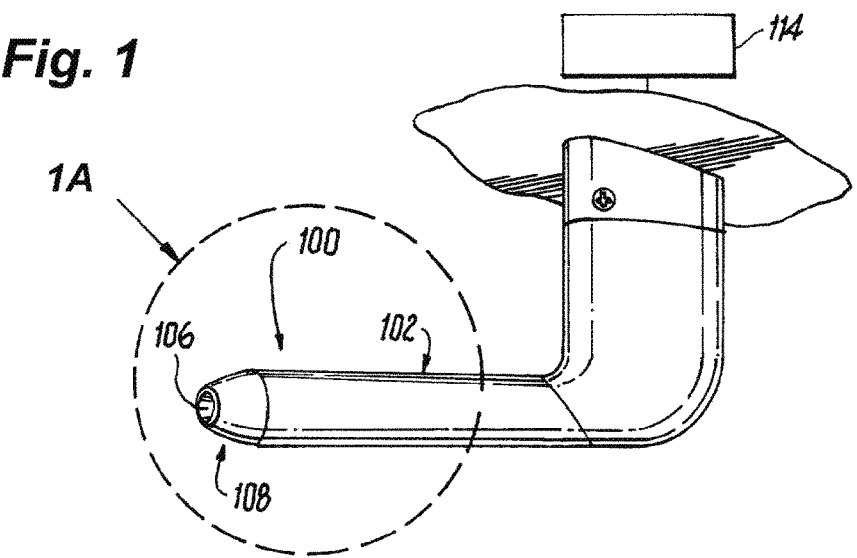
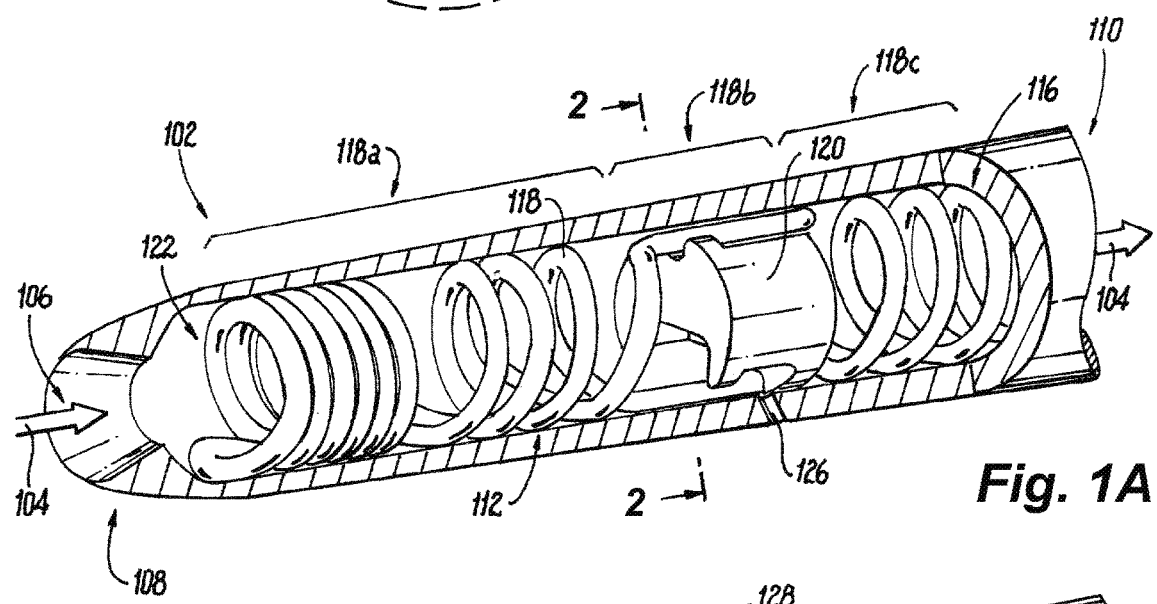
Fig. 1A
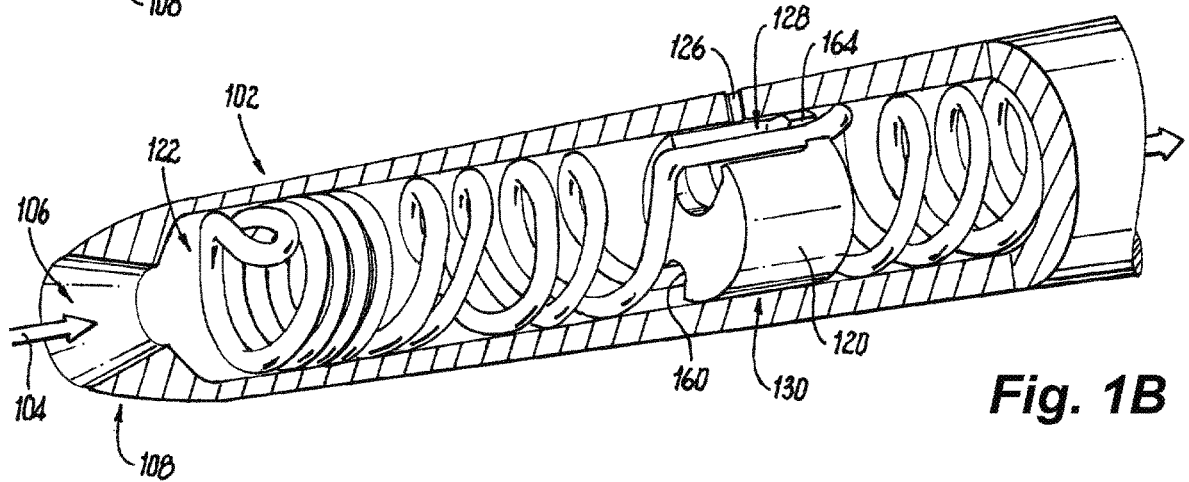
Fig. 1B

BULKHEADS AND WATER DAMS FOR AIR DATA PROBES

TECHNICAL FIELDS

The present disclosure relates to bulkheads and more particularly to bulkheads and water dams for use in air data probes.

BACKGROUND

Typical water dams and bulkheads used in pitot tubes are tack brazed to the heater using a unique low temperature braze alloy prior to inserting the heater into the probe housing. A standard nickel-based braze operation used to permanently affix the heater/water dam assembly inside the pitot tube. However, the low temperature braze reflows and tends to float to the surface instead of mixing. This has the potential of creating foreign object debris inside the pitot tube.

The conventional techniques have been considered satisfactory for their intended purpose. However, there is an ever-present need for improved systems and methods for retaining a water dam during installation of a heater assembly into a pitot tube. This disclosure provides a solution for this need.

SUMMARY

In accordance with at least one aspect of this disclosure, an air data probe includes, an outer shell defining an airflow path from an inlet at a proximal end thereof to a distal end thereof and a heater configured to be installed within the outer shell an in the airflow path. The system also includes, a water dam configured to be disposed on or in the heater and between a proximal end and distal end of the heater. The water dam is configured to impede a flow of water in the airflow path to prevent interaction of the flow of water and one or more sensing elements operatively connected to the air data probe. The water dam is configured to mechanically stabilize itself on or in the heater during installation of the heater and the water dam into the outer shell.

The system can include one or more drainage holes defined through the outer shell configured to drain water stopped by the water dam from the outer shell. In embodiments, the water dam can be configured to be installed proximate the drainage holes when the water dam is attached to the heater and when the heater is installed into the outer shell.

In embodiments, the heater can include a heater coil configured to wind around or within the outer shell and/or around or within the water dam. The heater coil can have at least one coiled portion and at least one straight portion, for example, in certain embodiments, the heater coil can have two coiled portions and one straight portion between the two coiled portions, where the water dam is configured to stabilize itself between on the straight portions and between the coiled portions. The water dam can be configured to mechanically stabilize itself in the straight portion of the heater coil during installation of the heater coil and the water dam into the outer shell to prevent misalignment of the water dam during installation and/or to prevent introduction of foreign object debris into the outer shell during installation. The system can be configured to eliminate the need for a low temperature tacking braze between the water dam and the heater coil prior to installation of the water dam and heater coil in the outer shell.

In embodiments, the water dam can be configured to retain itself to the heater coil prior to and during installation of the heater coil and the water dam into the outer shell without fixing (e.g., brazing) the water dam to the heater coil prior to installation.

In embodiments, the water dam can be formed as a single piece bulkhead configured to extend between a first side and a second side of the heater coil. In certain embodiments, wherein the single piece water dam is configured to replace an existing multi-piece water dam such that a cross sectional area of the flow path through the single piece water dam is unchanged and such that a diameter of the two-piece water dam is unchanged (e.g., as compared to the multi-piece water dam).

In embodiments, the water dam can be of a first material and the outer shell can be of a second material. In certain embodiments, the first material can be the same as the first material to prevent thermal mismatch between the bulkhead and the outer shell and/or galvanic corrosion of the water dam.

In embodiments, the air data probe can be a pitot tube, a pitot-static probe, or multi-function air data probe. In certain embodiments, the water dam can be configured to be a bulkhead.

In embodiments, the water dam can include, a monolithic body. The monolithic body can include, a first face having an inlet defined therethrough and a second face opposite the first face defining an outlet therethrough such that the airflow path passes through the inlet to the outlet through the monolithic body. In embodiments, the monolithic body can include a first notch defined in an outer periphery of the first face and a second notch defined in an outer periphery of the second face, the first and second notches configured to interact with the heater coil.

In certain embodiments, the water dam can be configured to be retrofit into an existing air data probe without redesign of internal components of the existing air data probe. In certain embodiments, a shape of the water dam can be configured to substantially replicate the function of an existing multi-piece water dam. In certain embodiments, the water dam can be additively manufactured. In certain embodiments, the bulkhead can be cast. In certain embodiments, the bulkhead can be of nickel.

In accordance with at least one aspect of this disclosure, a method can include manufacturing a water dam having a monolithic body, the monolithic body including a first face having an inlet defined therethrough and a second face opposite the first face defining an outlet therethrough such that a fluid flow path is defined from the inlet to the outlet through the monolithic body. The method can include installing the water dam onto or into a heater of an air data probe and inserting the heater and water dam into an outer shell of the air data probe before (e.g., without first) brazing the water dam to the heater.

In embodiments, installing the water dam onto or into the heater of the air data probe can include mechanically locking the water dam to a portion of the heater. In certain embodiments, the water dam is not brazed to the heater before the heater and water dam are inserted into the outer shell. In certain embodiments, installing the water dam onto or into the heater of the air data probe includes retrofitting the water dam onto or into an existing heater of an existing air data probe.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, other embodiments thereof will be described in detail herein below with reference to certain figures, wherein:

FIG. 1 is a perspective view of an air data probe in accordance with this disclosure FIG. 1A is a top partial perspective view of an air data probe in accordance with this disclosure, showing one or more internal components of the air data probe, including a water dam;

FIG. 1B is an underside partial perspective view of the air data probe of FIG. 1;

DETAILED DESCRIPTION

Figure 2:
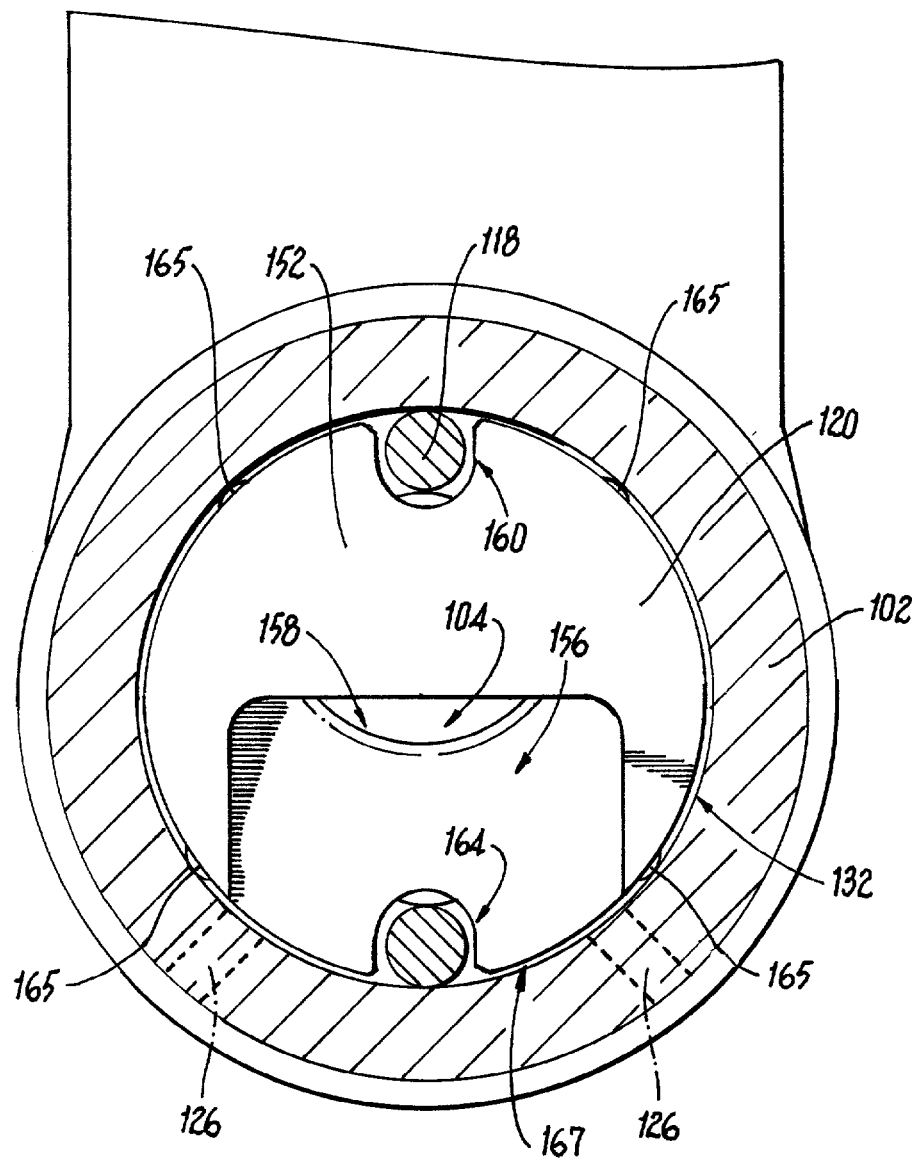
FIG. 2 is a cross-sectional front end elevation view of the air data probe of FIG. 1.

Reference will now be made to the drawings wherein like reference numerals identify similar structural features or aspects of the subject disclosure. For purposes of explanation and illustration, and not limitation, an illustrative view of an embodiment of a probe in accordance with the disclosure is shown in FIG. 1 and is designated generally by reference character 100. Other embodiments and/or aspects of this disclosure are shown in FIGS. 2-3B.

In accordance with at least one aspect of this disclosure, an air data probe 100 (e.g., a pitot tube as shown) can include, an outer shell 102 defining an airflow path 104 from an inlet 106 at a proximal end 108 thereof to a distal end 110 thereof and one or more internal components 112 configured to be installed within the outer shell 102 and in the airflow path 104. One or more sensing elements and/or electronics 114 can be included remotely, at a distal end 116 of the airflow path, or within the distal end 110 of the outer shell 102, configured to measure at least one air data parameter based at least in part on a pressure of the airflow in the airflow path 104, for example to measure total pressure.

The one or more internal components 112 can include a heater coil 118 configured to wind around or within the outer shell 102 and/or a water dam 120. The heater coil 118 can have at least one coiled portion 118a and at least one straight portion 118b, for example, in certain embodiments (e.g., as shown), the heater coil 118 can have two coiled portions 118a and one straight portion 118b between the two coiled portions 118a.

The one or more internal components can also include, a water dam 120 configured to be disposed on or in the heater 118 and between a proximal end 122 and distal end 124 heater 118 configured to substantially reduce or eliminate the direct line-of-sight path through the airflow passage 104. One or more drainage holes 126 can be defined through the outer shell 102 configured to drain the water stopped by the water dam 120 and the outer shell 102. In embodiments, the water dam can impede water droplets and/or ice crystals within in the airflow path 104 from reaching the sensing components 114 and can allow the drain holes 126 to function properly. This can prevent water from collecting in other areas of the probe 100, in pressure lines, or interacting with one or more sensing elements or electronics 114, all of which could potentially cause measurement error. In embodiments, the water dam 120 can be positioned, when installed in the outer shell 102, proximate the drainage holes 126.

The water dam 120 is configured to mechanically stabilize itself on or in the heater 118 during installation of the heater 118 into the outer shell 102. As shown, the water dam 120 can be configured to mechanically stabilize itself in the straight portion of the heater coil 118 to prevent misalignment of the water dam 120 during installation and thereby eliminate the need to use a low temperature tack brazing material which could later be a source of foreign object debris. For example, the water dam is configured to stabilize itself between on the straight portion 118b and between the coiled portions 118a, where the water dam 120 is axially bookended by the coiled portions 118a to prevent axial movement of the bulkhead 120 during installation. In embodiments, the water dam 120 can be configured to retain itself to the heater coil 118 prior to and during installation of the heater coil 118 and the water dam 120 into the outer shell 102 without fixing (e.g., tack brazing) the water dam 120 to the heater coil 118 prior to installation.

Figure 3A:
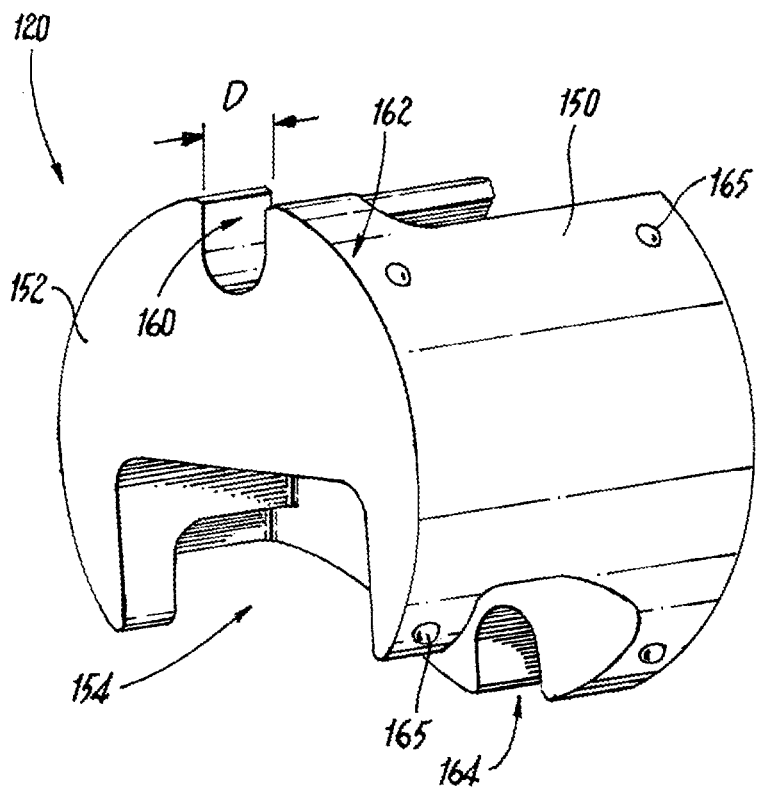
FIG. 3A is a frontward, right side perspective view of the water dam of FIG. 1.
Figure 3B:
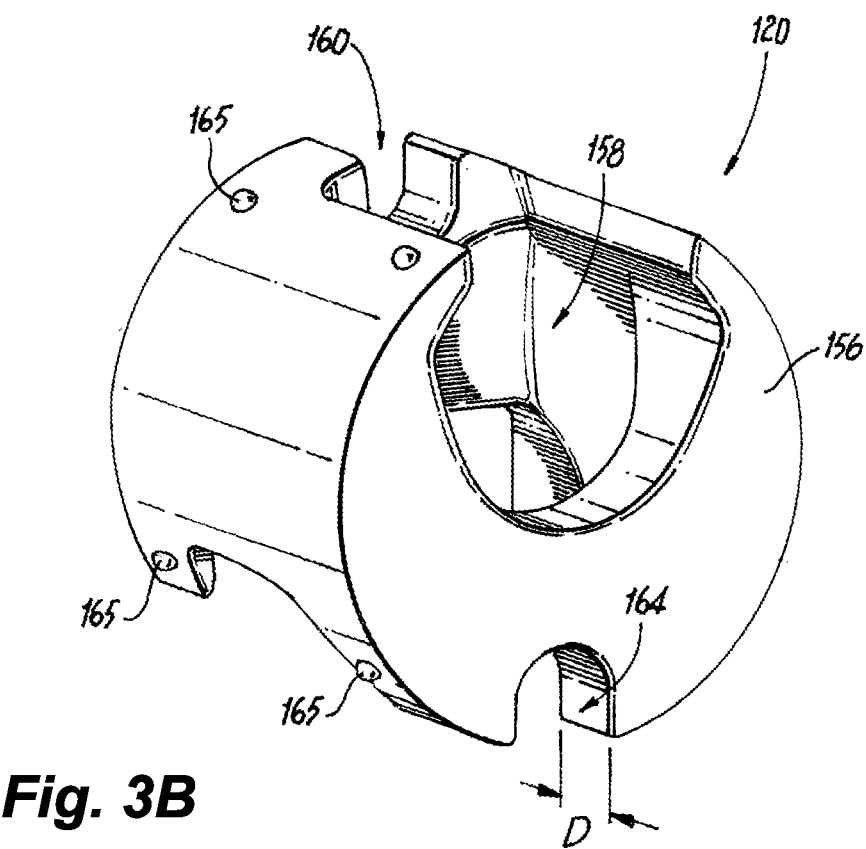
FIG. 3B is a rearward, right side perspective view of the water dam of FIG. 1.

With reference now to FIGS. 3A and 3B, in embodiments, the water dam 120 can include, a monolithic body 150. The monolithic body 150 can include, a first face 152 having an inlet 154 defined therethrough and a second face 156 opposite the first face 152 defining an outlet 158 therethrough such that the airflow path 104 passes through the inlet 154 to the outlet 158 through the monolithic body 150. In embodiments, the monolithic body 150 can include a first notch 160 defined in an outer periphery 162 of the first face 152 and a second notch 164 defined in an outer periphery 166 of the second face 156, the first and second notches 160, 164 configured to allow the heater coil 118 to pass through (as shown in FIG. 2). In embodiments, e.g., as shown, the first and second notches can extend along an axial depth D of the outer periphery 162, 166 of each of the first and second faces 152, 156 of the body 150.

In certain embodiments, e.g., as shown in FIGS. 2-3B, the monolithic body 150 can include one or more dimples or protrusions 165 on the external diameter of the water dam 120. The dimples/protrusions can be configured to assist with centering the water dam 120 within the outer shell 102 when the heater 118 and water dam 120 are inserted into the outer shell 102 to create an even gap 167 between the inner surface of the outer shell and the water dam 120 to assist with proper braze flow.

In embodiments, the water dam 120 can be formed as a single piece water dam 120 configured to extend between a first side 128 and a second side 130 of the heater coil 118 (e.g., as shown in FIG. 1B). In embodiments, the water dam 120 can be configured to replace existing multi-piece or planar water dams (e.g., a conventional two-piece bulkhead) without redesign of the heater coil 118 and so that the diameter of the water dam 120 (or an inner surface 132 of the outer shell 102) is unchanged. In embodiments, the cross-sectional area of the flow path through the water dam 120 can also remain unchanged.

In certain embodiments, the water dam 120 can be configured to be retrofit into an existing air probe without substantial redesign of the existing air data probe. In certain embodiments, a shape of the water dam 120 can be configured to substantially replicate the function of an existing two-piece water dam. In certain embodiments, the water dam can be additively manufactured, and in addition to replicating the shape and function of a conventional two-piece water dam, the shape of the water dam 120 can be designed to support higher build layers if the water dam 120 is additively manufactured. Additive manufacturing allows for simpler manufacturing for complex shapes of water dams. In certain embodiments, the water dam can be cast or formed by any other suitable machining process. In embodiments, the water dam 120 can be of a first material and the outer shell 102 can be of a second material. In certain embodiments, the first material can be the same as the first material to prevent thermal mismatch between the water dam 102 and the outer shell 102 and/or galvanic corrosion of the bulkhead 120. In certain embodiments, for example, the water dam 120 can be of nickel.

As used herein, a "water dam" can be configured to block water droplets or ice crystals that enter the pitot port from penetrating too far into the probe while allowing airflow to pass through the water dam. If water droplets or ice crystals enter the pitot port, they will continue in an essentially straight-line until impeded by something. Embodiments of the water dam disclosed herein is therefore placed in the pitot chamber to eliminate the straight-line path of the water and/or ice through the pitot chamber while still allowing unimpeded air movement. A bulkhead, as used herein, can include a structure configured to create isolated chambers within a probe such that multiple independent pressures can be measured (e.g., such as in pitot-static or multi-function probes). Embodiments described herein include a water dam, however, in certain embodiments, the water dam can be configured as a bulkhead.

In accordance with at least one aspect of this disclosure, a method can include manufacturing a water dam (e.g., water dam 120) having a monolithic body 150, the monolithic body including a first face 152 having an inlet 154 defined therethrough and a second face 156 opposite the first face 150 defining an outlet 158 therethrough such that a fluid flow path (e.g., fluid path 114) is defined from the inlet 154 to the outlet 158 through the monolithic body 150. The method can include installing the water dam onto the heater 112 of an air data probe (e.g., system 100). The method can include inserting the heater and water dam into an outer shell (e.g., shell 102) of the air data probe without first tack brazing the water dam to the heater coil.

In embodiments, installing the water dam onto or into the heater coil of the air data probe can include mechanically locking the water dam to a heater coil (e.g., heater coil 118). In certain embodiments, the water dam is not brazed to the heater coil before the heater coil and water dam are inserted into the outer shell. In certain embodiments, installing the water dam onto or into the heater coil of the air data probe includes retrofitting the water dam onto or into an existing heater coil of an existing air data probe.

Typically when installing heater coil and into an air data probe, such as a pitot tube, the water dam (and bulkheads, if any) must be tacked into place on the heater coil using a first, low temperature braze alloy, so that the bulkhead does not shift during installation of the heater coil into the outer shell. However, this tacking braze can sometimes break during installation causing misalignment of the bulkhead, or cause small pieces of braze to become debris in the bottom of the outer shell, which can plug the drainage holes. In some cases, when the heater and/or water dam is later brazed to the outer shell with a second, higher temperature braze, the second brazing step can cause the initial low temperature tacking braze to reflow or spatter, causing misalignment of the water dam or debris.

Embodiments of the mechanically locking water dam described herein can be a single, unitary piece, which can lock onto or into the heater without tacking braze and thus can eliminate the initial tacking braze operation. Embodiments can greatly reduce the potential of foreign object debris created inside the pitot tube by eliminating the use of the low temperature braze alloy. Embodiments can facilitate more repeatable/uniform positioning of the water dam/bulkhead inside the pitot tube assembly. Embodiments can also streamline the bill of materials by eliminating the need for the unique low temperature braze alloy and combining multiple water dams or bulkheads into one.

Embodiments of the water dam described herein can be readily interchangeable to nearly any pitot tube, without changing the overall design of the pitot tube and without changing the diameter of the outer shell, the diameter of the water dam, or the heater coil. Accordingly, embodiments are suitable for retrofitting into existing air data probes without redesign of surrounding components and without a resulting change in performance. In certain embodiments, however, the bulkhead is suitable for a newly manufactured sensing system, and embodiments can be suitable for covering with insulative materials if desired.

In embodiments, the shape of a bulkhead or water dam can be manufactured to replicate the shape of one or more existing water dams and/or bulkheads, for example if multiple planar water dams are being retrofit. In certain embodiments, the shape of the water dam or bulkhead can be determined to support a manufacturing method, such as to support higher build layers if manufactured by additive manufacturing, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. An air data probe, comprising:
   an outer shell defining an airflow path from an inlet at a proximal end thereof to a distal end thereof;
   a heater configured to be installed within the outer shell and in the airflow path; and
   a water dam configured to be disposed on or in the heater and between a proximal end and distal end of the heater, the water dam configured to impede a flow of water in the airflow path or interaction of water with one or more sensing elements, wherein the water dam is configured to mechanically stabilize itself on or in the heater during installation of the heater and the water dam into the outer shell, wherein the water dam comprises:
      one or more protrusions located on an external diameter of the water dam, wherein the one or more protrusions are configured to position the water dam within the outer shell such that when the heater and the water dam are inserted into the outer shell an even gap is created between an inner surface of the outer shell and the water dam, wherein the water dam is not brazed to the outer shell.

2. The air data probe of claim 1, further comprising one or more drainage holes defined through the outer shell configured to drain water stopped by the water dam out of the outer shell.

3. The air data probe of claim 2, wherein the heater includes a heater coil configured to wind around or within the outer shell, the heater coil having at least one coiled portion and at least one straight portion.

4. The air data probe of claim 3, wherein the water dam is configured to mechanically stabilize itself in the straight portion of the heater coil during installation of the heater coil and the water dam into the outer shell to prevent misalignment of the water dam during installation.

5. The air data probe of claim 4, wherein the water dam is configured to retain itself to the heater coil prior to and during installation of the heater coil and the water dam into the outer shell without fixing the water dam to the heater coil.

6. The air data probe of claim 1, wherein the water dam is a single piece water dam configured to extend between a first side and a second side of the heater coil.

7. The air data probe of claim 1, wherein the water dam is of a first material and the outer shell is of a second material, wherein the first material is the same as the second material to prevent thermal mismatch between the bulkhead and at least one of the outer shell or galvanic corrosion of the water dam.

8. The air data probe of claim 1, wherein the air data probe is a pitot tube, pitot-static probe, or multi-function air data probe.

9. The air data probe of claim 8, wherein the water dam is configured to be a bulkhead.

10. The air data probe of claim 1, wherein the water dam comprises:
    a monolithic body, comprising:
       a first face having an inlet defined therethrough and a second face opposite the first face defining an outlet therethrough such that the airflow path is passes through the inlet to the outlet through the monolithic body.

11. The air data probe of claim 10, wherein the monolithic body further includes a first notch defined in an outer periphery of the first face and a second notch defined in an outer periphery of the second face, wherein the first and second notches are configured to interact with the heater.

12. A method, comprising:
    manufacturing a water dam having a monolithic body, the monolithic body including a first face having an inlet defined therethrough and a second face opposite the first face defining an outlet therethrough such that a fluid flow path is defined from the inlet to the outlet through the monolithic body;
    installing the water dam onto or into a heater of an air data probe;
    inserting the heater and water dam into an outer shell of the air data probe without first brazing the water dam to the heater, wherein the water dam comprises:
       one or more protrusions located on an external diameter of the water dam, wherein the one or more protrusions are configured to position the water dam within the outer shell such that when the heater and the water dam are inserted into the outer shell an even gap is created between an inner surface of the outer shell and the water dam.

13. The method of claim 12, wherein installing the water dam onto or into the heater of the air data probe includes mechanically locking the water dam to a portion of the heater, and wherein the water dam is not brazed to the heater coil before the heater and water dam are inserted into the outer shell.

14. The method of claim 12, wherein installing the water dam onto or into the heater of the air data probe includes retrofitting the water dam onto or into an existing heater of an existing air data probe.

* * * * *